United States Patent
Chiba et al.

(10) Patent No.: US 9,794,342 B2
(45) Date of Patent: Oct. 17, 2017

(54) STORAGE SYSTEM AND CONTROL METHOD FOR STORAGE SYSTEM

(71) Applicant: Hitachi, Ltd., Tokyo (JP)

(72) Inventors: Takeru Chiba, Tokyo (JP); Hideo Saito, Tokyo (JP); Tomohiro Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 14/770,589

(22) PCT Filed: Aug. 20, 2013

(86) PCT No.: PCT/JP2013/072149
§ 371 (c)(1),
(2) Date: Aug. 26, 2015

(87) PCT Pub. No.: WO2015/025358
PCT Pub. Date: Feb. 26, 2015

(65) Prior Publication Data
US 2016/0006810 A1    Jan. 7, 2016

(51) Int. Cl.
| | |
|---|---|
| *G06F 15/16* | (2006.01) |
| *H04L 29/08* | (2006.01) |
| *G06F 13/14* | (2006.01) |
| *H04L 7/00* | (2006.01) |
| *G06F 3/06* | (2006.01) |

(52) U.S. Cl.
CPC .......... *H04L 67/1097* (2013.01); *G06F 3/067* (2013.01); *G06F 3/0617* (2013.01); *G06F 3/0635* (2013.01); *G06F 3/0689* (2013.01); *G06F 13/14* (2013.01); *H04L 7/0008* (2013.01)

(58) Field of Classification Search
None
See application file for complete search history.

(56) References Cited

U.S. PATENT DOCUMENTS

| | | | | |
|---|---|---|---|---|
| 6,421,711 | B1 * | 7/2002 | Blumenau | G06F 3/0605 709/213 |
| 6,952,737 | B1 * | 10/2005 | Coates | G06F 3/0607 707/E17.01 |

(Continued)

FOREIGN PATENT DOCUMENTS

JP    2007-286946 A    11/2007

OTHER PUBLICATIONS

International Search Report of PCT/JP2013/072149.

*Primary Examiner* — Natasha Cox
(74) *Attorney, Agent, or Firm* — Mattingly & Malur, PC

(57) ABSTRACT

A virtual storage apparatus based on a plurality of storage apparatuses including a first storage apparatus and a second storage apparatus is provided to a host computer. A first logical unit of the first storage apparatus and a second logical unit of the second storage apparatus are provided to the host computer in a form of a virtual logical unit. The first storage apparatus is configured to return a response to an inquiry about port statuses from the host computer designating the virtual logical unit, the response indicating that the status of the first port is a status as indicated by the first port management information and the second storage apparatus is unavailable to respond to the inquiry about port statuses. The second storage apparatus is configured to return no response to the inquiry.

15 Claims, 13 Drawing Sheets

(56) References Cited

U.S. PATENT DOCUMENTS

| | | | |
|---|---|---|---|
| 7,266,556 B1 * | 9/2007 | Coates | G06F 11/2094 |
| 2003/0188085 A1 * | 10/2003 | Arakawa | G06F 3/0605 |
| | | | 711/100 |
| 2004/0103261 A1 * | 5/2004 | Honda | G06F 3/0605 |
| | | | 711/202 |
| 2007/0245106 A1 | 10/2007 | Maki et al. | |
| 2009/0198896 A1 | 8/2009 | Maki et al. | |
| 2011/0202718 A1 | 8/2011 | Maki et al. | |
| 2012/0137096 A1 | 5/2012 | Maki et al. | |
| 2012/0179846 A1 * | 7/2012 | Haustein | G06F 3/061 |
| | | | 710/38 |
| 2012/0278584 A1 * | 11/2012 | Nagami | G06F 3/0607 |
| | | | 711/170 |
| 2015/0331753 A1 * | 11/2015 | Nakajima | G06F 3/067 |
| | | | 714/15 |
| 2016/0004615 A1 * | 1/2016 | Uehara | G06F 3/06 |
| | | | 714/6.22 |

* cited by examiner

| | | PATH 1 | | | PATH 2 | | |
|---|---|---|---|---|---|---|---|
| VIRTUAL STORAGE APPARATUS ID | VIRTUAL LU ID | PORT ID | PG ID | PG STATUS | PORT ID | PG ID | PG STATUS |
| 0x00 | 0x00 | 0x10 | 0x00 | ACTIVE/ OPTIMIZED | 0X30 | 0X40 | ACTIVE/ NON-OPTIMIZED |
| 0x00 | 0x01 | 0x11 | 0x00 | ACTIVE/ OPTIMIZED | 0X31 | 0X40 | ACTIVE/ NON-OPTIMIZED |
| 0x00 | 0x02 | 0x12 | 0x01 | ACTIVE/ NON-OPTIMIZED | 0X32 | 0X41 | OFFLINE |
| 0x00 | 0x03 | 0x13 | 0x02 | UNAVAILABLE | 0X33 | 0X42 | ACTIVE/ OPTIMIZED |
| ... | ... | ... | ... | ... | ... | ... | ... |

PATH DEFINITION TABLE
100

*Fig. 4A*

| | PG STATUS | R/W REQUEST | STATUS REQUEST | PORT STATUS TO BE RESPONDED TO REQUEST FROM HOST COMPUTER |
|---|---|---|---|---|
| 1 | ACTIVE/ OPTIMISED | YES | YES | PREFERRED PORT |
| 2 | ACTIVE/ NON-OPTIMISED | YES | YES | NON-PREFERRED PORT |
| 3 | STANDBY | NO | YES | STANDBY PORT |
| 4 | UNAVAILABLE | NO | YES | UNAVAILABLE PORT |
| 5 | OFFLINE | NO | NO | UNRESPONSIVE PORT |

*Fig. 4B*

Figures 5C, 5D:
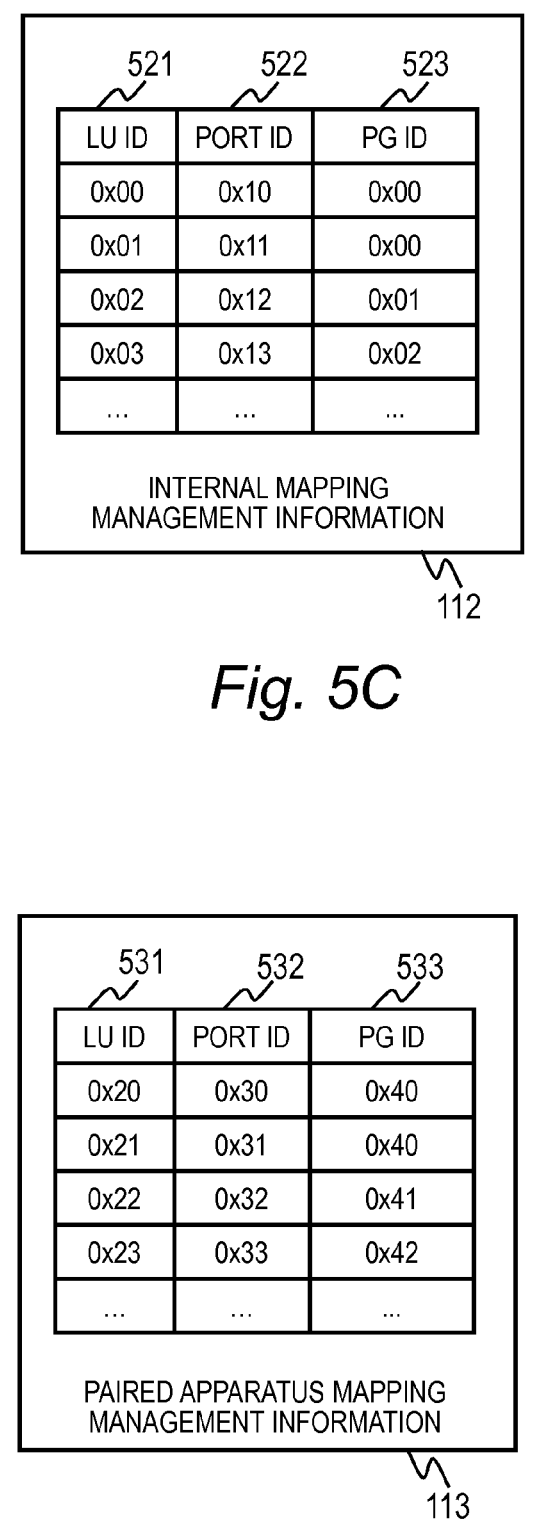

| 521 | 522 | 523 |
|---|---|---|
| LU ID | PORT ID | PG ID |
| 0x00 | 0x10 | 0x00 |
| 0x01 | 0x11 | 0x00 |
| 0x02 | 0x12 | 0x01 |
| 0x03 | 0x13 | 0x02 |
| ... | ... | ... |

INTERNAL MAPPING MANAGEMENT INFORMATION

| 531 | 532 | 533 |
|---|---|---|
| LU ID | PORT ID | PG ID |
| 0x20 | 0x30 | 0x40 |
| 0x21 | 0x31 | 0x40 |
| 0x22 | 0x32 | 0x41 |
| 0x23 | 0x33 | 0x42 |
| ... | ... | ... |

PAIRED APPARATUS MAPPING MANAGEMENT INFORMATION

| PG ID | APPARATUS INFORMATION | PG STATUS |
|---|---|---|
| 0x00 | LOCAL | ACTIVE/OPTIMIZED |
| 0x01 | LOCAL | ACTIVE/NON-OPTIMIZED |
| ... | ... | ... |
| 0x40 | PAIRED APPARATUS | — |
| ... | ... | ... |

PG STATUS MANAGEMENT TABLE

Fig. 5E

STORAGE SYSTEM AND CONTROL METHOD FOR STORAGE SYSTEM

BACKGROUND

This invention relates to a storage system and a control method for the storage system.

The background art includes JP 2007-286946 A (Patent Literature 1), which discloses a computer system which allows an access to the latest data by access to either one of two high-availability (HA)-configured storage apparatuses.

Patent Literature 1: JP 2007-286946 A

SUMMARY

Active-Active HA configuration implemented with multiple volumes pretends an HA volume pair of a primary volume and a secondary volume (hereinafter, also referred to as logical units) to be a single logical unit (virtual logical unit) to provide a host computer. Active-Active HA configuration implemented with multiple storage apparatuses pretends an HA storage apparatus pair of a primary storage apparatus and a secondary storage apparatus (hereinafter, also simply referred to as apparatuses) to be a single storage apparatus (virtual storage apparatus) to provide a host computer.

In the case of pretending a plurality of logical units to be a single virtual logical unit to provide a host computer, a plurality of paths exist for the host computer to access the virtual logical unit. The host computer requests the virtual storage apparatus for a report about the statuses of all ports associated with the virtual logical unit to determine the path to use in accessing the virtual logical unit. The request can be a REPORT TARGET PORT GROUPS command in SCSI (Small Computer System Interface).

In the case of pretending a plurality of storage apparatuses to be a single virtual storage apparatus to provide a host computer, the storage apparatus in receipt of a port status report request needs to report the statuses of not only the local ports in the apparatus but also the ports in the apparatus paired with the apparatus to form an HA storage apparatus pair (hereinafter, simply referred to as paired apparatus).

However, when a communication failure occurs between the storage apparatuses, one storage apparatus cannot know the statuses of the ports of the paired apparatus. Accordingly, the response to a port status report request from a storage apparatus could be inconsistent with the response from the paired storage apparatus. The responses must be consistent among all the storage apparatuses providing a virtual storage apparatus.

An aspect of this invention is a storage system configured to provide a host computer with a virtual storage apparatus based on a plurality of storage apparatuses including a first storage apparatus and a second storage apparatus capable of communicating with each other. The first storage apparatus is configured to provide a first logical unit and including a first port associated with the first logical unit and first port management information including information on a status of the first port. The second storage apparatus is configured to provide a second logical unit and including a second port associated with the second logical unit and second port management information including information on a status of the second port. The first logical unit and the second logical unit are provided to the host computer in a form of a virtual logical unit. The first storage apparatus is configured to return a response to an inquiry about port statuses from the host computer designating the virtual logical unit, the response indicating that the status of the first port is a status as indicated by the first port management information and the second storage apparatus is unavailable to respond to the inquiry about port statuses. The second storage apparatus is configured to return no response to an inquiry about port statuses from the host computer designating the virtual logical unit.

An aspect of this invention allows an Active-Active HA-configured storage system to return an appropriate response to an inquiry about port statuses.

BRIEF DESCRIPTION OF THE DRAWINGS

FIG. 4A depicts an example of information stored in a path definition table of a storage apparatus;

FIG. 4B depicts an example of definitions of port group statuses to be responded from a storage apparatus to a host computer;

FIG. 5C depicts a configuration example of an internal mapping management table in a storage apparatus;

FIG. 5D depicts a configuration example of a paired apparatus mapping management table in a storage apparatus;

FIG. 5E depicts a configuration example of a PG status management table in a storage apparatus;

DETAILED DESCRIPTION OF EMBODIMENTS

Figure 1:
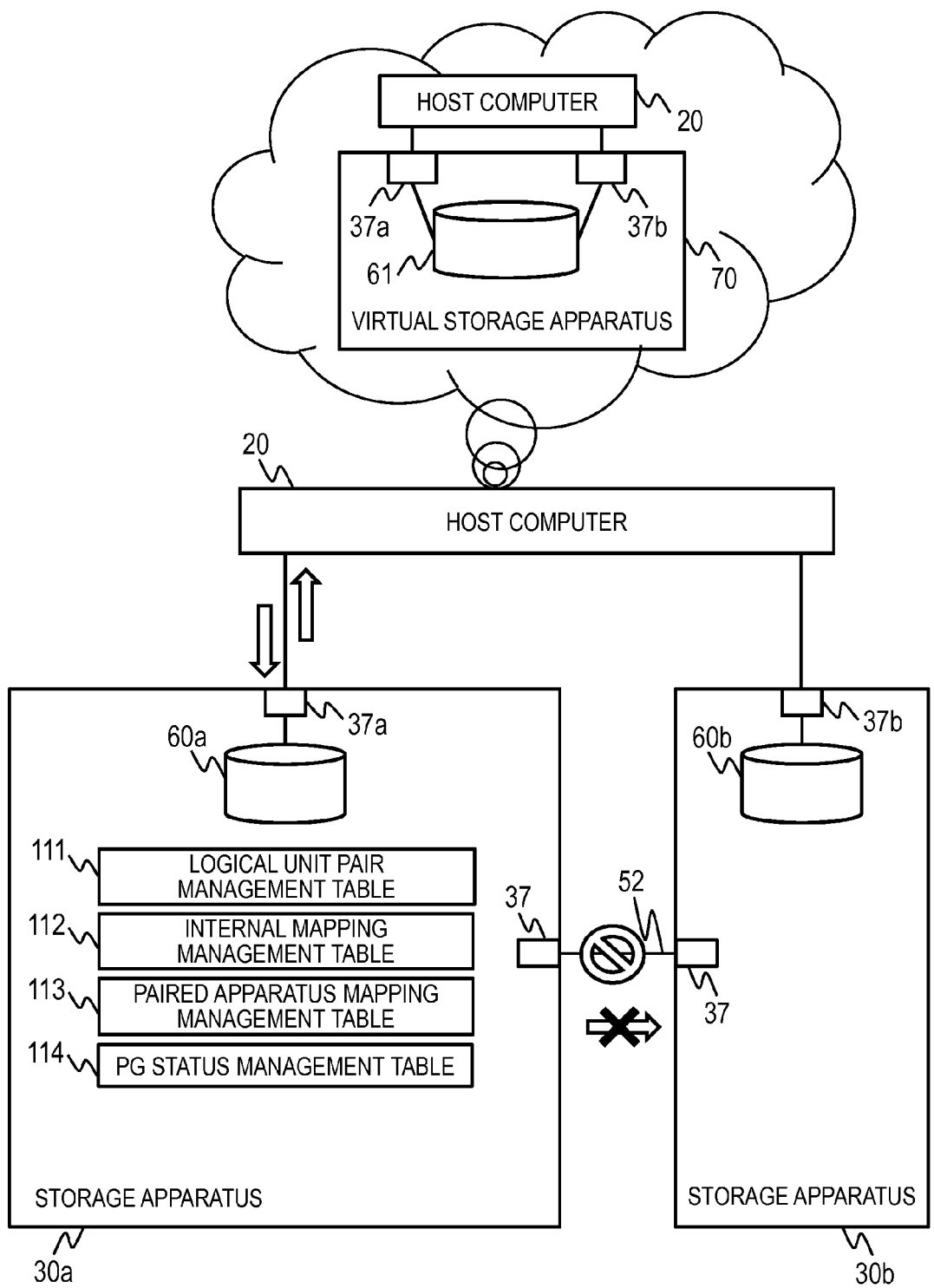
FIG. 1 depicts a general representation of an information system.

Hereinafter, embodiments of this invention will be described with reference to the accompanying drawings. It should be noted that the embodiments are merely examples to implement this invention and are not to limit the technical scope of this invention. Throughout the drawings, common elements are denoted by the same reference signs.

Information systems demanding extremely high availability (service continuity) such as mission-critical systems for financial institutions employ HA (High Availability) configuration in addition to a high-reliability scheme utilizing a technology such as RAID (Redundant Array of Independent (or Inexpensive) Disks).

The HA configuration is configured with duplicated systems and implements an automatic failure recovery function that automatically cuts off a failed system upon occurrence of a failure to keep the system working with the remaining normal system. In recent days, Active-Active HA configuration has particularly come up to attention that operates all the systems as active systems to attain effective resource utilization and load balancing.

Currently, Active-Active HA configuration configured with duplicated storage controllers within a single apparatus is in practical use. In the meanwhile, the demand for Active-Active HA configuration configured with duplicated storage apparatuses is expected to grow.

The Active-Active HA configuration of duplicated storage apparatuses pretends an HA storage apparatus pair formed of two storage apparatuses (physical storage apparatuses) to be a single virtual storage apparatus to provide a host computer. The HA configuration of duplicate storage apparatuses further pretends a logical unit pair provided by the two different storage apparatuses to be a single virtual logical unit to provide the host computer. The host computer accesses the virtual logical unit; accordingly, the host computer can use either path to the logical unit pair.

For example, in an Active-Active HA configuration of duplicated storage apparatuses installed in the same data center, it takes almost the same time for a host computer to access a virtual logical unit (different logical units forming the virtual logical unit), regardless of the used path. Accordingly, the path used by the host computer to access a virtual logical unit does not substantially affect the performance.

In the meanwhile, for the aim of disaster recovery, it is preferable that the storage apparatuses in Active-Active HA configuration be installed in remote sites distant from each other. An HA configuration of storage apparatuses in remote data centers generates a large difference in the time for a host computer to access a virtual logical unit, depending on the used path.

For example, one path is associated with a logical unit owned by a storage apparatus located close to the host computer; it takes a short time to access the virtual logical unit by using this path. The other path is associated with a logical unit owned by a storage apparatus located more than 100 km away from the host computer; it takes a long time to access the virtual logical unit by using this path.

In such an environment, it is preferable to employ asymmetric Active-Active HA configuration where the storage apparatuses can place preferences to the paths (ports) to be used. This configuration is called ALUA (Asymmetric Logical Unit Access) configuration. The ALUA configuration enables the host computer to preferentially use a less-latency path, attaining both of the performance and the availability.

Specifically, the ALUA configuration is implemented as follows. In response to a REPORT TARGET PORT GROUPS command issued from the host computer to a virtual logical unit, a storage apparatus reports the statuses (PG statuses) of port groups (PGs) of the ports associated with the virtual logical unit. Examples of the PG status to be assigned include "preferred" and "non-preferred". The host computer preferentially uses the "preferred" port group (path) over the "non-preferred" port group (path).

The virtual storage apparatus must be recognized as a single storage apparatus by the host computer. To which storage apparatus the REPORT TARGET PORT GROUPS command is sent depends on the host computer. The response to this command must be consistent among the storage apparatuses that constitute the virtual storage apparatus. Described hereinafter is a storage system for solving this response consistency issue.

Embodiment 1

This embodiment describes a method of implementing ALUA configuration with multiple storage apparatuses. FIG. 1 depicts a general representation of an information system in this embodiment. The storage apparatuses 30a and 30b are recognized by the host computer 20 as a single virtual storage apparatus 70.

Logical units (also referred to as LUs) 60a and 60b constitute an HA pair (HA logical unit pair) and they are recognized by the host computer 20 as a single virtual logical unit 61. The ports 37a and 37bare respectively associated with the unit 60a and 60b but are recognized by the host computer 20 as being associated with the virtual logical unit 61. That is to say, the mapping information held by the host computer 20 associates the ports 37a and 37bwith the virtual logical unit 61.

When a REPORT TARGET PORT GROUPS command issued from the host computer 20 to the virtual logical unit 61 is received by the storage apparatus 30a, for example, the storage apparatus 30a requests the storage apparatus 30b to report the PG status of the port group including the port 37b. If this report request results in error, the storage apparatus 30a checks the availability for I/O of its own logical unit 60a with reference to the logical unit pair management table 111.

Port groups are groups created by separating all the ports owned by the storage apparatuses 30a and 30b forming the virtual storage apparatus 70. Each port group consists of one or more ports. In the example described below, a port group is formed of a single port in a storage apparatus.

When the logical unit 60a of the storage apparatus 30a is assigned a status indicating "available for I/O", the storage apparatus 30a responds the PG status indicated in the PG status management table 114 to the host computer 20 for the status of the port group including the port 37a.

The storage apparatus 30a responds a PG status corresponding to "unavailable for response" to the host computer 20 for the status of the port group including the port 37b. This response makes the host computer 20 recognize that the host computer 20 cannot access the port 37b. Alternatively, the storage apparatus 30a may provide no information on the port 37bto respond the PG status corresponding to "unavailable for response" to the host computer 20.

If the logical unit 60a in the storage apparatus 30a is assigned a status corresponding to "unavailable for I/O", the storage apparatus 30a does not send a response to the REPORT TARGET PORT GROUPS command.

This configuration enables each of the storage apparatuses 30a and 30b to make a consistent response to a REPORT TARGET PORT GROUPS command from the host computer 20 even if a failure occurs in the communications between the storage apparatuses 30a and 30b. Thus, ALUA configuration of multiple storage apparatuses can be implemented.

The ALUA configuration yields a high available and high performance system particularly for a user provided with HA configuration implemented with storage apparatuses in data centers separated over 100 km for the purpose of disaster recovery. Furthermore, for a user operating a plurality of virtual servers on a plurality of host computers, the ALUA configuration yields a system that can effectively utilize the system resources because the plurality of storage apparatuses are accessible from each virtual server.

Figure 2:
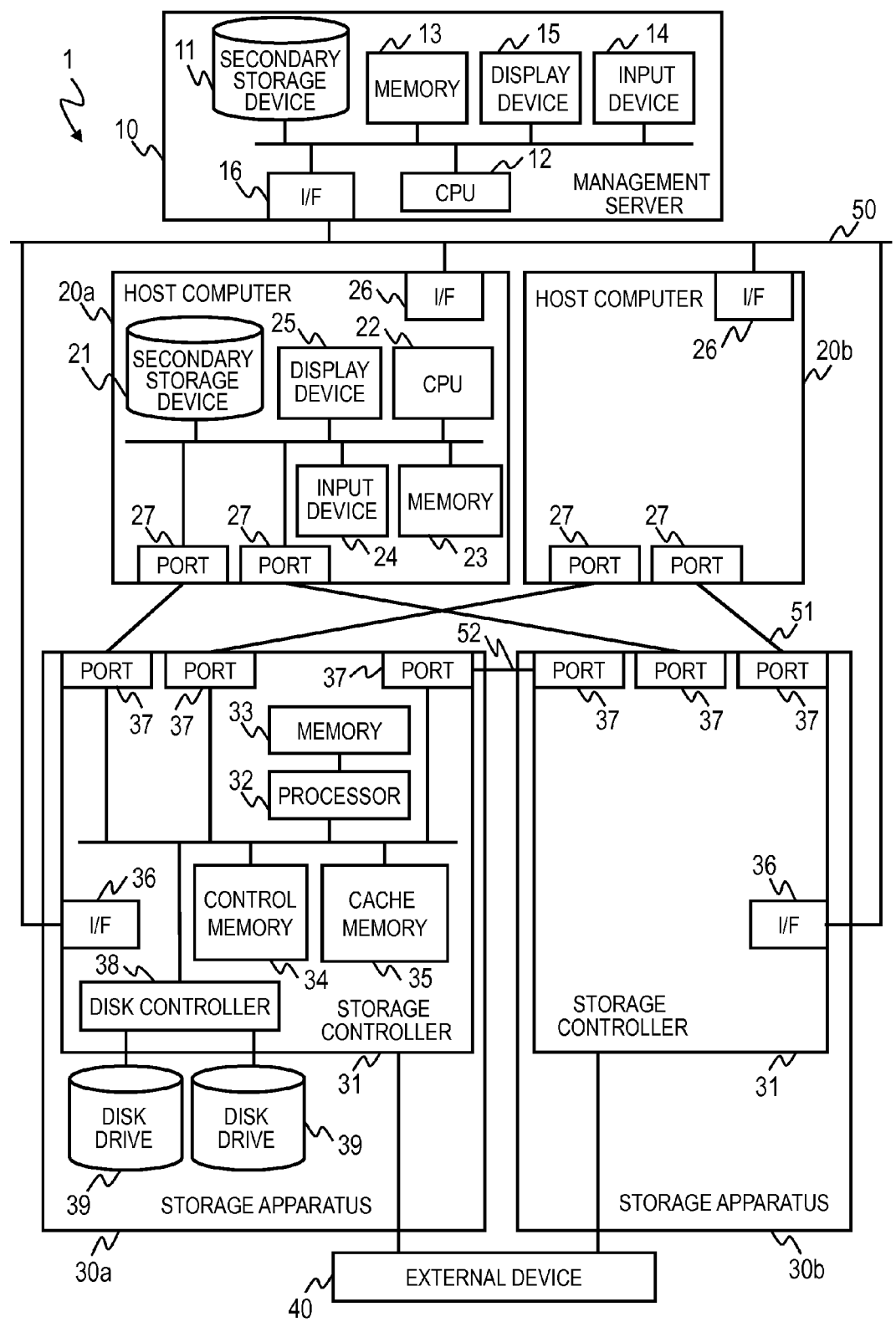
FIG. 2 depicts an example of a configuration of the information system.

FIG. 2 depicts an example of a configuration of an information system 1 including storage apparatuses 30 in this embodiment. In the following description, host computer 20 represents one or more host computers. The same applies to other components such as storage apparatus 30, logical unit 60, and port 37.

The information system 1 includes a management server 10, host computers 20a and 20b, storage apparatuses 30a and 30b, and an external device 40. Although FIG. 2 shows one management server 10, two host computers 20a and 20b, and two storage apparatuses 30a and 30b, the numbers of these apparatuses are not limited.

The host computers 20a and 20b, the storage apparatuses 30a and 30b, and the external device 40 are interconnected by data communication lines 51. The management server 10 is connected with the host computers 20a and 20b, and the storage apparatuses 30a and 30b by equipment control lines 50.

The management server 10 includes a secondary storage device 11, a CPU 12 of a processor, a memory 13 of a primary storage device, an input device 14, a display device 15 of an output device, and an interface (I/F) 16. These are interconnected by an internal network.

Each host computer 20 includes a secondary storage device 21, a CPU 22 of a processor, a memory 23 of a primary storage device, an input device 24, a display device 25 of an output device, an interface (I/F) 26, and ports 27. These are interconnected by an internal network.

The CPU 22 executes a program stored in the memory 23 to perform a variety of processing. For example, the CPU 22 sends an I/O request to a storage apparatus 30 to access a logical unit provided by the storage apparatus 30.

Each of the storage apparatuses 30a and 30b includes a storage controller 31 and disk drives 39. The disk drives 39 store data requested to be written by a host computer 20 (either one of the host computers 20a and 20b).

The storage controller 31 controls the overall storage apparatus 30 (either one of the storage apparatuses 30a and 30b). For example, the storage controller 31 controls data retrieval from the disk drives 39. The storage controller 31 provides storage areas of disk drives 39 to the host computers 20 in the form of one or more logical units. Upon receipt of a request for information on a logical unit or an apparatus from a host computer 20, the storage controller 31 converts a storage apparatus ID and a logical unit ID into a virtual storage apparatus ID and a virtual logical unit ID, and provides the converted IDs to the host computer 20.

The storage controller 31 includes a processor 32, a memory 33, a control memory 34, a cache memory 35, an I/F 36, ports 37, and a disk controller 38. These are interconnected by an internal network.

The processor 32 executes a program stored in the memory 33 or the control memory 34 to perform a variety of processing. The memory 33 stores programs to be executed by the processor 32 and information required by the processor 32. The memory 33 and the control memory 34 do not need to be distinguished. The cache memory 35 stores data to be written to the disk drives 39 and data retrieved from the disk drives 39 on a temporal basis.

Each port 37 is used to connect to a host computer 20 or a paired storage apparatus 30. This example is based on an assumption that the ports 37 support the Fibre Channel I/F using SCSI as upper-layer protocol. The ports 37 may be other kinds of ports supporting network I/Fs such as the IP network I/F using SCSI as upper-layer protocol.

This example describes the ports 37 assuming that they are physical ports; however, the ports 37 may be virtual ports virtualized using a technique such as NPIV (N_Port ID Virtualization).

The disk controller 38 controls data write to the disk drives 39 and data retrieval from the disk drives 39. The storage areas of the disk drives 39 are provided to the storage apparatus 30 in the form of one or more logical units 60. The external device 40 is used to check whether each storage apparatus 30 is working normally when an inter-apparatus communication failure occurs.

The storage apparatuses 30a and 30b are interconnected by an inter-apparatus data communication line 52. Although FIG. 2 shows only one inter-apparatus data communication line 52, a plurality of communication lines may exist, for example, a data communication line for data communications from the storage apparatus 30a to the storage apparatus 30b and a data communication line for data communication from the storage apparatus 30b to the storage apparatus 30a.

Next, the outline of processing in the information system 1 in this embodiment is described. The information system 1 in this embodiment pretends a plurality of storage apparatuses 30 (physical storage apparatuses 30) to be a single storage apparatus (virtual storage apparatus 70) to provide a host computer 20 and further, pretends a plurality of logical units (real storage units) 60 to be a single logical unit (virtual logical unit) 61 to provide the host computer 20. The specific means for providing the virtual storage apparatus 70 and the virtual logical unit 61 to the host computer 20 will be described later with reference to FIG. 7.

Figure 3A:
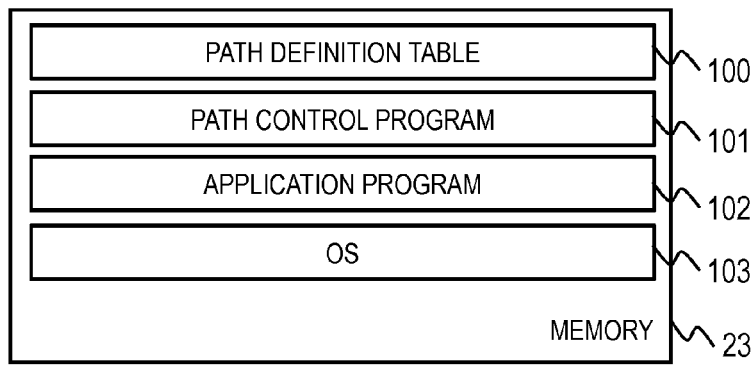
FIG. 3A depicts an example of information stored in the memory of each storage apparatus.

FIG. 3A depicts an example of information stored in the memory 23 in each host computer 20. The memory 23 holds programs to be executed by the CPU 22 and information to be required by the CPU 22. As illustrated in FIG. 3A, the memory 23 holds a path definition table 100, a path control program 101, an application program 102, and an OS 103.

The path definition table 100 includes information on the paths to be used to access the logical units 60 in the storage apparatuses 30. The path definition table 100 will be described later with reference to FIG. 4A.

The path control program 101 controls the paths to be used to access the logical units 60 in the storage apparatuses 30. The path control program 101 controls the paths with reference to the path definition table 100.

The application program 102 executes a variety of processing. For example, the application program 102 provides database functionality or web server functionality. The OS 103 controls the overall processing in the host computer 20.

Figure 3B:
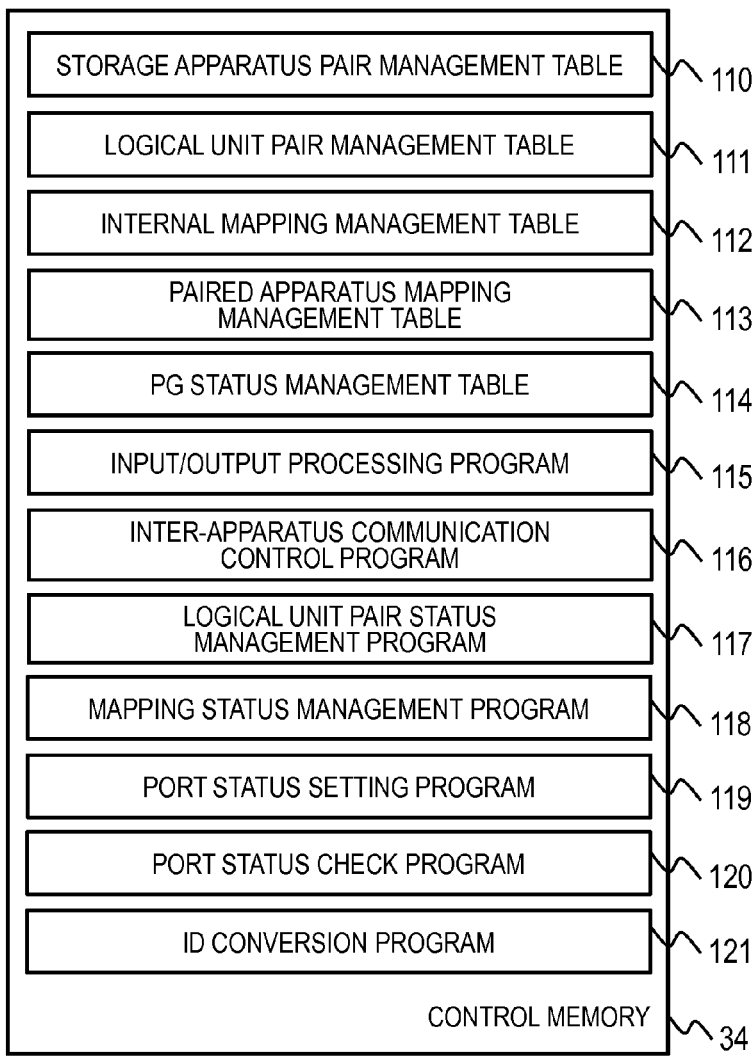
FIG. 3B depicts an example of information stored in the control memory of each storage apparatus.

FIG. 3B depicts an example of information stored in the control memory 34 in each storage apparatus 30. The control memory 34 holds programs to be executed by the processor 32 and information to be required by the processor 32. The control memory 34 holds a storage apparatus pair management table 110, a logical unit pair management table 111, an internal mapping management table 112, a paired apparatus mapping management table 113, and a PG status management table 114.

The control memory 34 further holds an input/output processing program 115, inter-apparatus communication control program 116, a logical unit pair status management program 117, a mapping status management program 118, a port status setting program 119, a port status check program 120, and an ID conversion program 121.

The storage apparatus pair management table 110 is information to manage HA storage apparatus pairs formed of storage apparatuses 30. An HA storage apparatus pair is formed of two storage apparatuses; a host computer 20 is provided with one virtual storage apparatus 70 corresponding to the HA storage apparatus pair. The storage apparatus pair management table 110 will be described later with reference to FIG. 5A.

The logical unit pair management table 111 is information to manage HA logical unit pairs formed of logical units 60 provided by the storage apparatuses 30*a* and 30*b*. An HA logical unit pair is formed of two logical units; a host computer 20 is provided with one virtual logical unit 61 corresponding to the HA logical unit pair. The logical unit pair management table 111 will be described later with reference to FIG. 5B.

The internal mapping management table 112, the paired apparatus mapping management table 113, and the PG status management table 114 are information to manage information on the ports 37 associated with the logical units 60 provided by the storage apparatuses 30. The internal mapping management table 112, the paired apparatus mapping management table 113, and the PG status management table 114 will be described later with reference to FIGS. 5C, 5D, and 5E, respectively.

The input/output processing program 115 processes I/O requests received from the host computers 20. The interapparatus communication control program 116 controls transmission of control information and user data between the storage apparatuses 30.

The logical unit pair status management program 117 manages the pair statuses of logical units 60 (HA logical unit pairs) forming virtual logical units 61. The logical unit pair status management program 117 determines whether a pair of logical units 60 is synchronous and stores the determination result in the logical unit pair management table 111.

In a synchronous pair, an update of one logical unit is reflected to the other logical unit each time. The logical unit pair status management program 117 determines whether a logical unit 60 is available for I/O and stores the determination result in the LU status (local) column 516 in the logical unit pair management table 111.

The mapping status management program 118 manages mapping of logical units 60 to ports 37 and stores the results to the internal mapping management table 112 and the paired apparatus mapping management table 113.

The port status setting program 119 stores the status of the port group of a port 37 to the PG status management table 114 based on an instruction from the administrator of the storage apparatuses 30 or the conditions of the storage apparatuses 30.

The port status check program 120 acquires the status of the port 37 designated by a port status report request received from a host computer 20 and returns a response to the host computer 20. In this example, the status of a port 37 corresponds to the PG status of the port group the port 37 belongs to.

Specifically, the response returned to the host computer 20 by the port status check program 120 includes the statuses of the port group of the local port 37 of the storage apparatus 30 and the port group of the port 37 of the paired storage apparatus 30 associated with the virtual logical unit 61 designated by the REPORT TARGET PORT GROUPS command.

The ID conversion program 121 converts a storage apparatus ID and a logical unit ID to a virtual storage apparatus ID and a virtual logical unit ID, respectively, and provides them to a host computer 20. The ID conversion program 121 converts a virtual storage apparatus ID and a virtual logical unit ID designated by a host computer 20 to a storage apparatus ID and a logical unit ID, respectively.

FIG. 4A depicts a configuration example of the path definition table 100 stored in the memory 23 of a host computer 20. The path definition table 100 manages the paths to access the virtual logical units 61.

The path definition table 100 has a virtual storage apparatus ID column 401, a virtual LU ID column 402, a path 1 column 403, and a path 2 column 404. The path 1 column 403 has a port ID column 421, a PG ID column 422, and a PG status column 423; likewise, the path 2 column 404 has a port ID column 431, a PG ID column 432, and a PG status column 433.

The virtual storage apparatus ID column 401 stores identifiers of virtual storage apparatuses to be accessed by the host computer 20. The identifiers are unique to the information system 1. The virtual LU ID column 402 stores identifiers of virtual logical units to be accessed by the host computer 20. The identifiers are unique to the information system 1. Each of the path 1 column 403 and the path 2 column 404 indicates a path to access the virtual logical unit 61 of the entry. This example provides information on only two paths.

The port ID columns 421 and 431 indicate the identifiers of the ports 37 associated with the virtual logical unit 61 of the entry. The PG ID columns 422 and 432 indicate the identifiers of the port groups the ports belong to. The port IDs and PG IDs are unique to the information system 1. The PG status columns 423 and 433 indicate the statuses of the port groups the ports belong to.

The path control program 101 requests the storage apparatuses 30*a* and 30*b* for values to be stored to the PG status columns 423 and 433 and stores the received values. FIG. 4B provides an example of definitions of PG statuses. The PG status column provides PG statuses to be indicated in the responses from the storage apparatuses 30 to the requests from the host computers 20. In the example of FIG. 4B, "Active/Optimized" corresponds to a preferred port in the ALUA configuration; "Active/Non-Optimized" corresponds to a non-preferred port in the ALUA configuration. The preferred port and the non-preferred port are operating ports; a host computer 20 accesses a virtual logical unit 61 by preferentially using the preferred port.

"Standby" corresponds to a standby port. When a failure occurs in an operating port, the access port is switched from the operating port to a standby port. "Unavailable" corresponds to an unavailable port and "Offline" corresponds to an unresponsive port.

The storage apparatus 30 responds to read/write accesses and requests for status information designating a preferred port or a non-preferred port. Examples of the request for status information are an INQUIRY command and a REPORT TARGET PORT GROUPS command.

The storage apparatus 30 does not accept read/write accesses designating a standby port or an unavailable port but accepts requests for status information and sends responses to the host computers 20. The storage apparatus 30 does not accept any request designating an offline port, that is to say, does not send responses to the host computers 20.

It should be noted that only a part of the foregoing statuses may be used; for example, "Standby" and "Unavailable" are rarely selected in operating a typical Active-Active HA configuration.

Figure 5A:
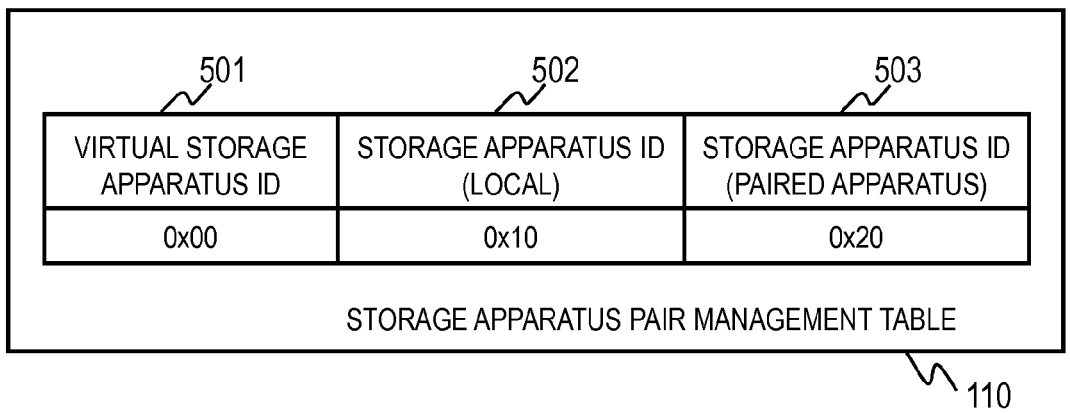
FIG. 5A depicts a configuration example of a storage apparatus pair management table in a storage apparatus.

FIG. 5A depicts a configuration example of the storage apparatus pair management table 110 stored in the control memory 34 of a storage apparatus 30. The storage apparatus pair management table 110 has a virtual storage apparatus ID column 501, a storage apparatus ID (local) column 502, and a storage apparatus ID column (paired apparatus) 503.

The virtual storage apparatus ID column 501 stores identifiers of virtual storage apparatuses 70 to be accessed by the host computers 20. The identifiers are unique to the information system 1 and are values common to the storage apparatuses forming an HA storage apparatus pair.

The storage apparatus ID (local) column 502 stores the identifier of the storage apparatus having the table 110 or a member apparatus of the virtual storage apparatuses 70. The storage apparatus ID (paired apparatus) column 503 stores the identifiers of the paired apparatuses or the other member apparatuses of the virtual storage apparatuses 70. The storage apparatus ID (local) column 502 and the storage apparatus ID (paired apparatus) column 503 store identifiers unique to the information system 1.

The storage apparatus 30 acquires a value stored in the storage apparatus ID (paired apparatus) column 503 to acquire the ID of the other storage apparatus 30 forming an HA storage pair with the storage apparatus 30.

Figure 5B:
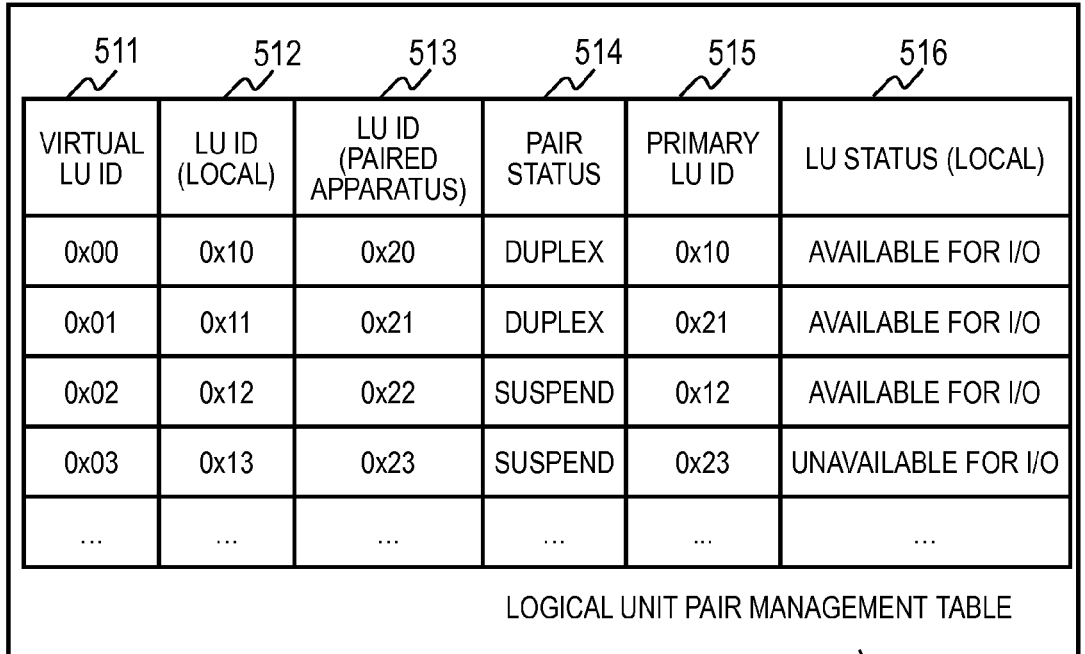
FIG. 5B depicts a configuration example of a logical unit pair management table in a storage apparatus.

FIG. 5B depicts a configuration example of the logical unit pair management table 111 stored in the control memory 34 of a storage apparatus 30. The logical unit pair management table 111 has a virtual LU ID column 511, an LU ID (local) column 512, an LU ID (paired apparatus) column 513, a pair status column 514, a primary LU ID column 515, and an LU status (local) column 516.

The virtual LU ID column 511 stores identifiers of virtual logical units 61 to be accessed by the host computers 20. The LU ID (local) column 512 indicates identifiers of local logical units in the storage apparatus 30 or members of the virtual logical units 61. The LU ID (paired apparatus) column 513 indicates identifiers of the logical units in the paired storage apparatus 30 or the other members of the virtual logical units 61.

The pair status column 514 indicates the statuses of the HA logical unit pairs forming the virtual logical units 61. For example, "Duplex" represents that the logical units 60 forming a virtual logical unit 61 are synchronous (meaning that the logical units 60 hold identical user data). "Suspend" represents that the logical units 60 forming a virtual logical unit 61 are not synchronous. For example, a communication failure between the storage apparatuses disables synchronism.

The primary LU ID column 515 indicates identifiers of the logical units 60 to be used preferentially to operate with only either one of the logical unit 60 in an HA logical unit pair. For example, when a communication failure occurs between the storage apparatuses, the logical unit 60 indicated by the primary LU ID is used preferentially.

The LU status (local) column 516 indicates LU statuses whether the local logical units 60 in the storage apparatus of members of virtual logical units 61 are "available for I/O" or "unavailable for I/O".

The logical unit pair status management program 117 manages pair statuses of the logical units 60 (HA logical unit pairs) forming virtual logical units 61. The logical unit pair status management program 117 determines whether each pair of logical units 60 are synchronous and stores the determination result to the logical unit pair management table 111. In a synchronous pair, an update of one logical unit 60 is reflected to the other logical unit 60 each time.

The values in the virtual LU ID column 511, the LU ID (local) column 512, the LU ID (paired apparatus) column 513, and the primary LU ID column 515 are preset, for example in accordance with instructions of the administrator.

Figure 6:
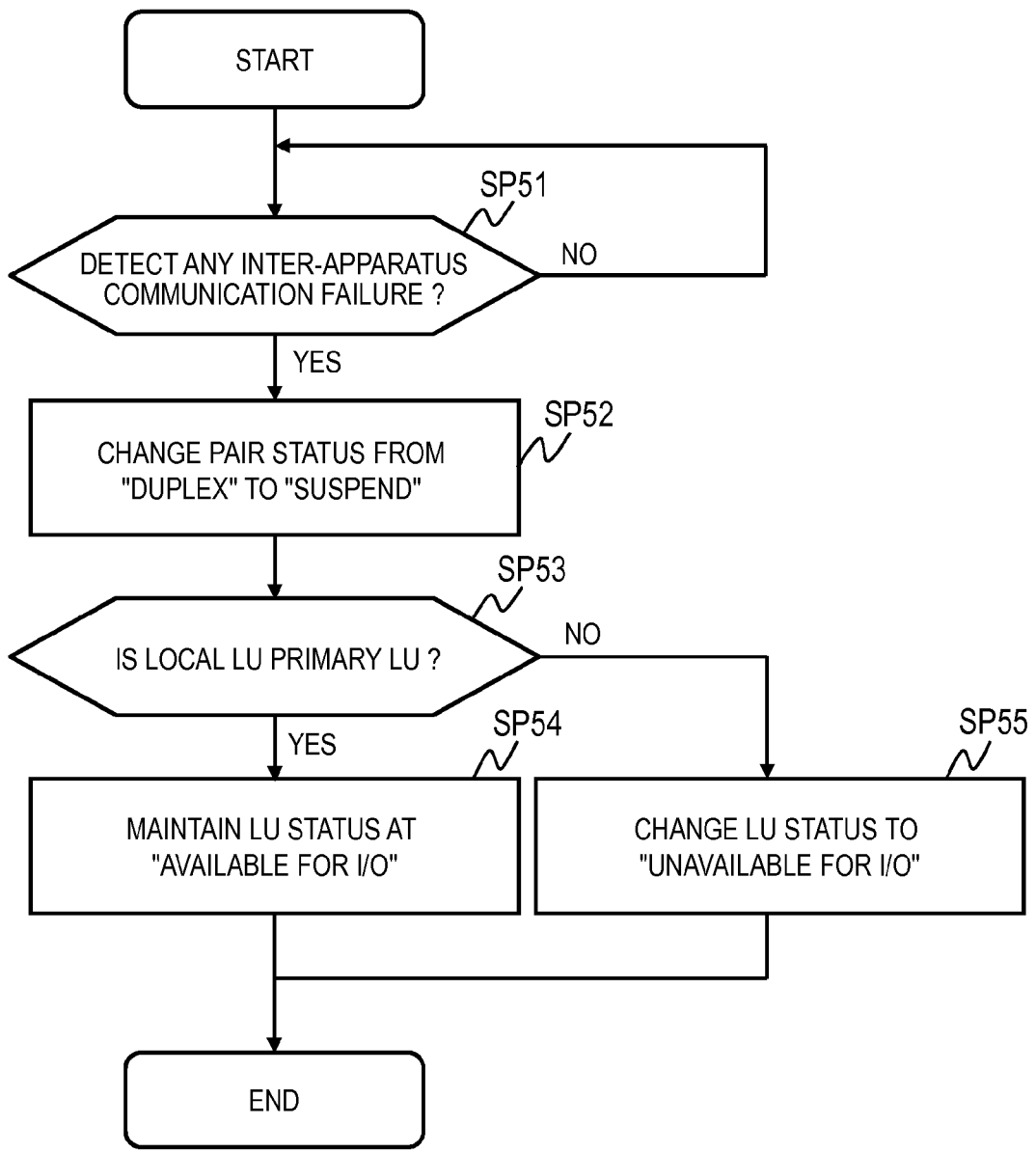
FIG. 6 is a flowchart depicting an outline of updating a logical unit pair management table.

Hereinafter, update of the logical unit pair management table 111 is described with reference to the configuration diagram of FIG. 5B and the flowchart of FIG. 6. Each of the storage apparatuses 30a and 30b monitors the communications between the storage apparatuses 30a and 30b for any failure (SP51). Synchronism in an HA logical unit pair could be lost because of a failure in either the storage apparatus 30a or the storage apparatus 30b or a failure in communication via the inter-apparatus data communication line 52 between the storage apparatuses 30a and 30b. The logical unit pair status management program 117 that has detected the loss of synchronism changes the value in the pair status column of the corresponding entry from "Duplex" to "Suspend" (SP52).

The logical unit pair status management program 117 can check the synchronism status of each HA logical unit pair by monitoring the conditions of the inter-apparatus data communication line 52 and the responses from the paired apparatus 30. When the synchronism in the HA logical unit pair is recovered, the logical unit pair status management program 117 changes the value in the pair status column 514 of the corresponding entry from "Suspend" to "Duplex".

The logical unit pair status management program 117 determines whether the local logical unit 60 is available for I/O and stores the determination result to the LU status (local) column 516 of the logical unit pair management table 111. For example, if the logical unit 60 cannot be accessed properly because of a failure in the apparatus 30, the LU status of this logical unit 60 should be "unavailable for I/O".

If the synchronism in an HA logical unit pair is lost because of a failure in communication through the inter-apparatus data communication line 52 between the storage apparatuses 30a and 30b, the logical unit pair status management program 117 refers to the primary LU ID column 515 (SP53).

If the primary LU ID column 515 of an entry indicating "Suspend" includes an LU ID of the apparatus 30 (SP53: YES), the logical unit pair status management program 117 maintains the value of the LU status (local) column 516 at "Available for I/O" (SP54). If the primary LU ID column 515 of an entry indicating "Suspend" includes an LU ID of the paired apparatus 30 (SP53: NO), the program 117 changes the value of the LU status (local) column 516 to "Unavailable for I/O" (SP55).

As noted from the above, the primary LU ID column 515 and the LU status (local) column 516 represent the preference of the port (logical unit/storage apparatus) when the synchronism is lost. With reference to the primary LU ID column 515, the storage apparatuses 30a and 30b can determine the LU status.

FIG. 5C depicts a configuration example of the internal mapping management table 112 stored in the control memory 34 of a storage apparatus 30. The internal mapping management table 112 stores mapping information on the logical units 60 existing in the apparatus having the table.

The internal mapping management table 112 includes an LU ID column 521, a port ID column 522, and a PG ID column 523. The LU ID column 521 stores the identifiers of the logical units 60 existing in the apparatus having the table 112. The port ID column 522 indicates the identifiers of the ports 37 associated with the logical units 60. The PG ID column 523 indicates the identifiers of the port groups the ports 37 belong to.

FIG. 5D depicts a configuration example of the paired apparatus mapping management table 113 stored in the control memory 34 of a storage apparatus 30. The paired apparatus mapping management table 113 stores mapping information on the logical units 60 existing in the apparatus 30 paired with the apparatus having the table 113 to form an HA storage apparatus pair.

The paired apparatus mapping management table 113 includes an LU ID column 531, a port ID column 532, and a PG ID column 533. The LU ID column 521 stores the identifiers of the logical units 60 existing in the apparatus 30 paired with the apparatus having the table 113 to form an HA storage apparatus pair. The port ID column 532 indicates the identifiers of the ports 37 associated with the logical units 60. The PG ID column 533 indicates the identifiers of the port groups the ports 37 belong to.

When the mapping status management program 118 updates the internal mapping management table 112, the inter-apparatus communication control program 116 notifies the paired apparatus 30 forming an HA storage apparatus pair of the specifics of the update. The mapping status management program 118 in the paired apparatus 30 in receipt of the update information updates the paired apparatus mapping management table 113 in accordance with the received information.

The storage apparatus 30 does not need to notify the paired apparatus 30 of the specifics of the update when the mapping status management program 118 updates the internal mapping management table 112. If the storage apparatus 30 wants to refer to the mapping information of the paired apparatus 30, the inter-apparatus communication control program 116 can request the paired apparatus 30 for mapping information each time. The mapping status management program 118 stores the response to the request to the paired apparatus mapping management table 113. Although this example associates one LU ID with one port ID, one logical unit 60 may be associated with a plurality of ports 37.

FIG. 5E depicts a configuration example of the PG status management table 114 stored in the control memory 34 of a storage apparatus 30. The PG status management table 114 includes a PG ID column 541, an apparatus information column 542 indicating the storage apparatus 30 (either the apparatus having the table 114 or the paired apparatus) managing the port group of the entry, and a PG status column 543 indicating the statuses of the port groups managed in the apparatus 30 having the table 114. The values in the PG status column 543 are preset by the administrator or otherwise, automatically determined by the storage apparatus 30. This will be described later.

Figure 7:
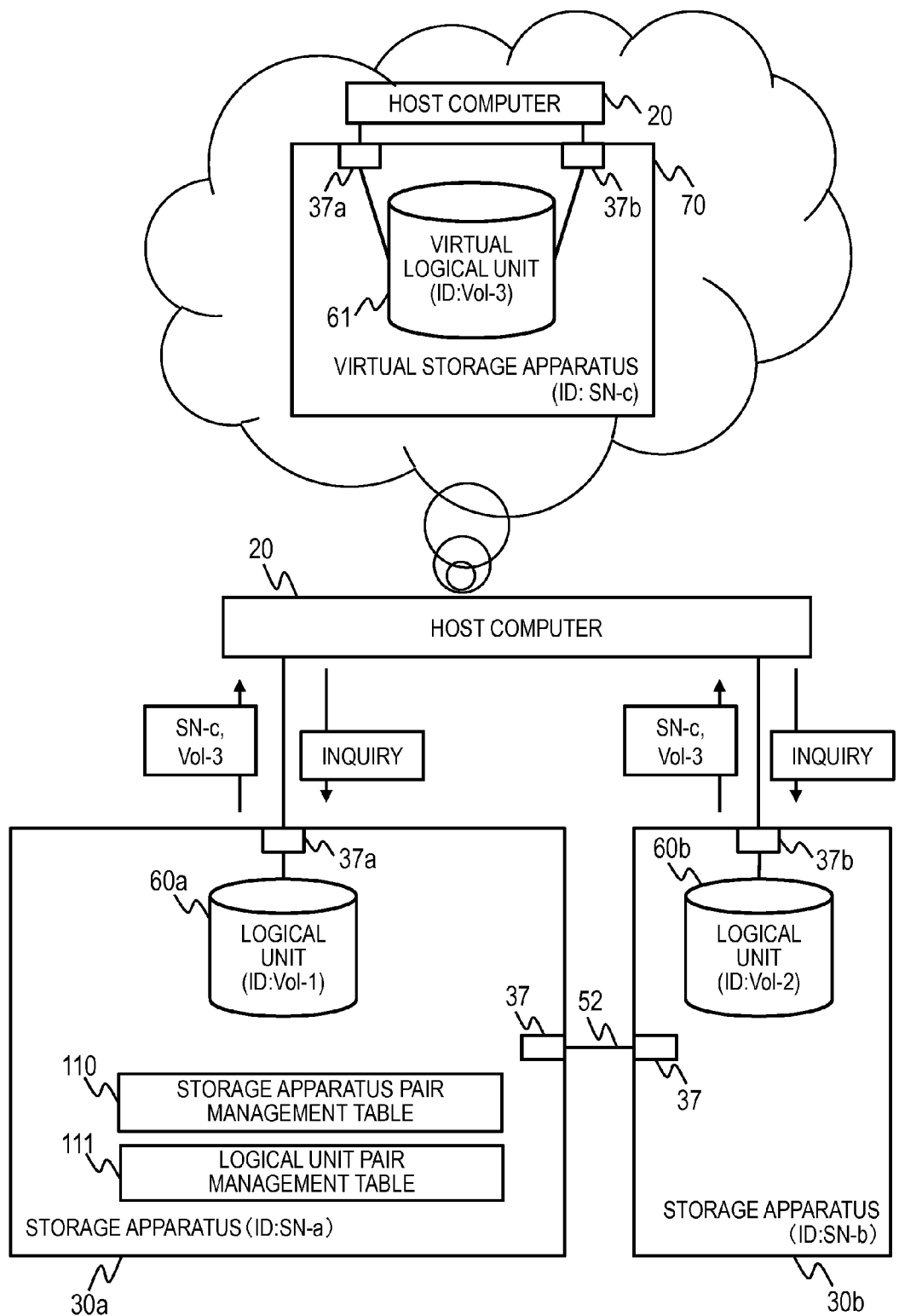
FIG. 7 depicts an example of a way to provide a virtual storage apparatus and a virtual logical unit to a host computer.

FIG. 7 is an overview diagram depicting the means for providing a virtual storage apparatus 70 and a virtual logical unit 61 to a host computer 20. When the host computer 20 requests the storage apparatus 30a (storage apparatus ID: SN-a) for a storage apparatus ID using, for example, a SCSI INQUIRY command, the storage apparatus 30a in receipt of the request refers to the storage apparatus pair management table 110 and responds a value (virtual storage apparatus ID: SN-c) acquired from the virtual storage apparatus ID column 501 to the host computer 20.

The values in the virtual storage apparatus ID column 501 are common to the storage apparatuses 30a and 30b forming an HA storage apparatus pair; the response to the request for a storage apparatus ID is the same regardless of the storage apparatus that has been sent the storage apparatus ID request. Hence, the storage apparatuses 30a and 30b forming an HA storage apparatus pair are provided to the host computer in the form of a single virtual storage apparatus 70.

In similar, when the host computer 20 requests the storage apparatus 30a for a logical unit ID using, for example, a SCSI INQUIRY command, the storage apparatus 30a in receipt of the request refers to the logical unit pair management table 111 and responds a value (virtual LU ID: Vol-3) acquired from the virtual LU ID column 511 to the host computer 20.

The values in the virtual LU ID column 511 are common to the storage apparatuses 30a and 30b forming an HA storage apparatus pair; the response to the request for an LU ID is the same regardless of the storage apparatus that has been sent the logical unit ID request. Hence, the logical units 60a and 60b forming an HA volume pair are provided to the host computer in the form of a single virtual logical unit 61.

Figure 8:
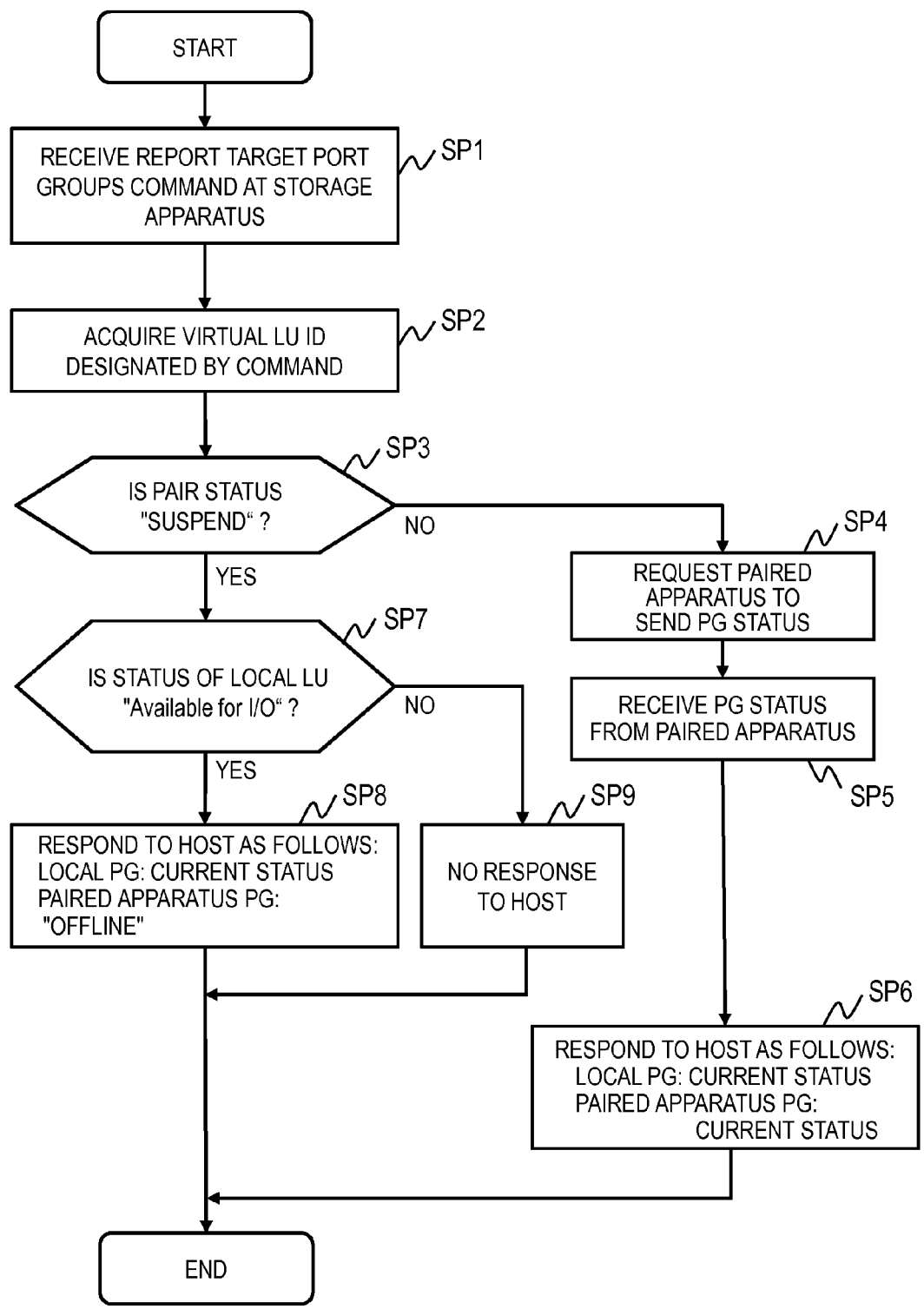
FIG. 8 is a flowchart depicting an outline of a method of responding to a port status report request received from a host computer.

FIG. 8 is a flowchart for a storage apparatus 30 to determine a response to a port status report request issued by a host computer 20. The storage apparatus 30 selects one of the PG statuses listed in FIG. 4B in response to a request from the host computer 20 designating a virtual logical unit 61.

This example uses a REPORT TARGET PORT GROUPS command in SCSI as a port status report request issued by the host computer 20 by way of example.

At Step SP1, the storage apparatus 30a receives a REPORT TARGET PORT GROUPS command issued from the host computer 20 to a virtual logical unit 61.

At Step SP2, the port status check program 120 of the storage apparatus 30a acquires a virtual LU ID of the virtual logical unit 61 included in the REPORT TARGET PORT GROUPS command and designated by the REPORT TARGET PORT GROUPS command.

At Step SP3, the port status check program 120 of the storage apparatus 30a refers to the logical unit pair management table 111 of the apparatus 30a and acquires information on the pair status of the virtual logical unit 61 having the virtual LU ID from the pair status column 514.

If the acquired pair status is "Duplex" (SP3: NO), the port status check program 120 executes Step SP4. If the acquired pair status is "Suspend" (SP3: YES), the port status check program 120 executes Step SP7.

At Step SP4, the port status check program 120 invokes the inter-apparatus communication control program 116 of the apparatus 30a. The inter-apparatus communication control program 116 sends the virtual LU ID to the paired apparatus 30b forming an HA storage apparatus pair and requests the apparatus 30b to report the PG status of the PG associated with the virtual LU ID.

The storage apparatus 30b in receipt of the request invokes the port status check program 120. The port status check program 120 of the storage apparatus 30b refers to the logical unit pair management table 111 of the apparatus 30b and acquires an LU ID in the apparatus 30b associated with the virtual LU ID from the LU ID column 512.

Next, the port status check program 120 refers to the internal mapping management table 112 of the apparatus 30b and acquires the PG ID associated with the acquired LU ID from the PG ID column 523. Next, the port status check program 120 refers to the PG status management table 114 of the apparatus 30b and acquires information on the PG status of the PG having the PG ID from the PG status column 543.

Next, the port status check program 120 invokes the inter-apparatus communication control program 116 of the apparatus 30b. The inter-apparatus communication control program 116 sends the acquired PG status to the storage apparatus 30a.

At Step SP5, the port status check program 120 of the storage apparatus 30a receives the information on the PG status from the paired apparatus 30b.

At Step SP6, the port status check program 120 of the storage apparatus 30a acquires information on the PG status of the PG associated with the virtual LU ID in the apparatus 30a from the PG status column 543 of the PG status management table 114 by the same method as the storage apparatus 30b.

The port status check program 120 refers to the logical unit pair management table 111 of the apparatus 30a and acquires the LU ID in the apparatus 30a and the LU ID in the apparatus 30b associated with the virtual LU ID from the LU ID (local) column 512 and the LU ID (paired apparatus) column 513, respectively.

The port status check program 120 refers to the internal mapping management table 112 of the apparatus 30a and acquires the PG ID associated with the LU ID in the apparatus 30a from the PG ID column 523. Furthermore, the port status check program 120 refers to the paired apparatus mapping management table 113 and acquires the PG ID associated with the LU ID in the paired apparatus 30b from the PG ID column 533.

Next, the port status check program 120 sends a response to the REPORT TARGET PORT GROUPS command to the host computer 20. The response includes a combination of the PG ID and its PG status in the apparatus 30a and a combination of the PG ID and its PG status in the paired apparatus 30b associated with the virtual LU ID. Hence, if the pair is synchronous, the host computer 20 can be informed of the port statuses (PG statuses) properly.

At Step SP7, the port status check program 120 refers to the logical unit pair management table 111 of the apparatus 30a and acquires the status of the LU in the apparatus 30a associated with the virtual LU ID from the LU status (local) column 516. If the LU status is "available for I/O" (SP7: YES), the port status check program 120 executes Step SP8. If the LU status is "unavailable for I/O" (SP7: NO), the port status check program 120 executes Step SP9.

At Step SP8, the port status check program 120 refers to the logical unit pair management table 111 of the apparatus 30a and acquires the LU ID in the apparatus 30a associated with the virtual LU ID from the LU ID (local) column 512.

Next, the port status check program 120 refers to the internal mapping management table 112 of the apparatus 30a and acquires the PG ID associated with the LU ID from the PG ID column 523. Next, the port status check program 120 refers to the PG status management table 114 of the apparatus 30a and acquires the PG status from the PG status column 543.

Next, the port status check program 120 refers to the paired apparatus mapping management table 113 of the apparatus 30a and acquires the PG ID in the paired apparatus 30b associated with the LU ID in the paired apparatus 30b from the PG ID column 533.

Next, the port status check program 120 sends a response to the REPORT TARGET PORT GROUPS command to the host computer 20. The response includes a combination of the PG ID and its PG status in the apparatus 30a and the PG ID and its PG status in the paired apparatus 30b. The PG status in the paired apparatus 30b to be reported in this response is "Offline" indicating that no communication is available via this port group.

Since communications between the storage apparatuses 30a and 30b are unavailable, the PG ID in the paired apparatus 30b reported to the host computer 20 at this step might be different from the PG ID actually associated with the LU ID in the paired apparatus 30b. The response to the host computer 20 at Step SP8 is that the status of the port group in the paired apparatus 30b is "Offline". As a result, the accesses from the host computer 20 to the virtual logical unit 61 do not use the port 37 of this port group, preventing problems in actual operation.

At Step SP9, the port status check program 120 of the storage apparatus 30a does not send a response to this REPORT TARGET PORT GROUPS command. When receiving no response from a storage apparatus 30 within a specific time, the host computer 20 determines that the port 37 used to send the REPORT TARGET PORT GROUPS command is inactive. The host computer 20 issues REPORT TARGET PORT GROUPS command using a different port 37 again.

The foregoing Steps SP8 and SP9 enable the storage apparatuses to make consistent responses to the host computer 20 even if the pair status is not synchronous.

In place of the foregoing operations, the mapping status management program 118 may delete the association of the port of the port group in the paired apparatus 30b with the virtual logical unit 61 from the paired apparatus mapping management table 113 and the PG status management table 114. These operations represent that the paired apparatus 30b cannot respond to the REPORT TARGET PORT GROUPS command.

In this case, the port status check program 120 reports only a combination of the PG ID and its PG status in the apparatus 30a associated with the virtual LU ID in response to the REPORT TARGET PORT GROUPS command. The port status check program 120 does not report anything about the PG ID and its PG status in the paired apparatus 30b associated with the virtual LU ID.

Meanwhile, the storage apparatus 30a does not need to have the paired apparatus mapping management table 113. In this configuration, the port status check program 120 cannot refer to the PG ID in the paired apparatus 30b at Steps SP6 and SP8. As a substitute for Step SP6, the PG ID associated with the virtual LU ID can be requested and received when requesting the storage apparatus 30b for the PG status and receiving the response at Steps SP4 and SP5. As a substitute for Step SP8, the port status check program 120 refers to the PG status management table 114 and responds "Offline" about any of the PG IDs other than the PG IDs having the value "local" in the apparatus information column 542.

At Step SP4, the inter-apparatus communication control program 116 may send the LU ID (paired apparatus) column 513 in the logical unit pair management table 111 to the paired apparatus 30b of an HA storage apparatus pair. In this case, the port status check program 120 of the storage apparatus 30b refers to the internal mapping management table 112 and acquires a PG ID associated with the acquired LU ID from the PG ID column 523.

To construct an ALUA configuration, the administrator of the storage apparatuses 30 assign PG statuses to the port groups to which individual ports 37 belong. For example, the administrator sets either "Active/Optimized" (preferred) or "Active/Non-Optimized" (non-preferred) to each of the port groups.

The administrator of the storage apparatuses 30 can freely determine the statuses for the port groups. For example, the administrator may determine the statuses in accordance with the following policies.

(1) Assume a case where only one of the two logical units 60 forming an HA logical unit pair forms a local copy pair. In this case, the administrator should set a status "Active/Optimized" (preferred) to the port group of the port 37 associated with the logical unit 60 forming a local copy pair with a backup logical unit.

Furthermore, the administrator should set a status "Active/Non-Optimized" (non-preferred) to the port group of the port 37 associated with the independent logical unit 60 not forming a local copy pair. As a result, the failure resistance of the virtual logical unit can be enhanced.

Figure 9:
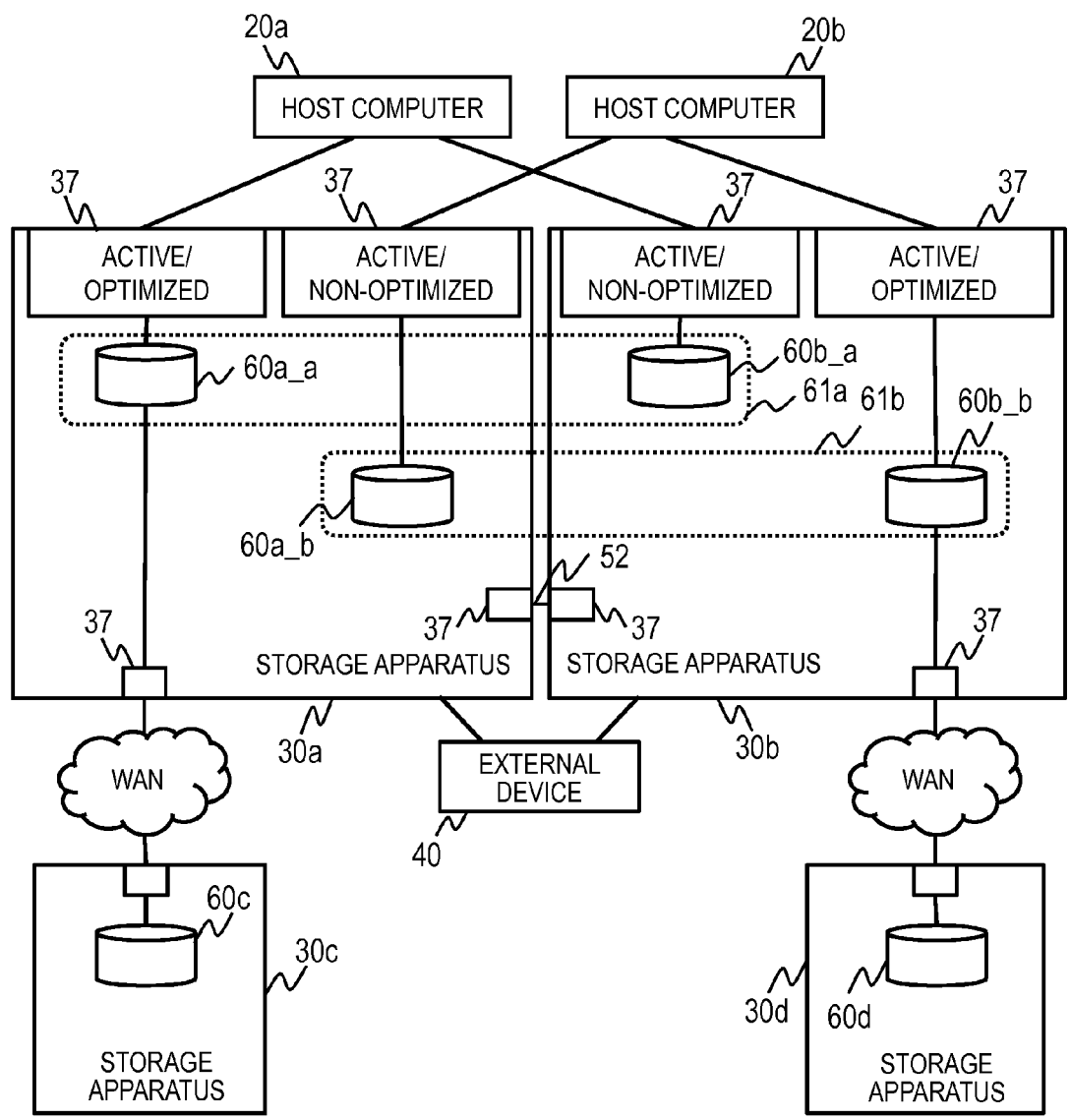
FIG. 9 depicts an example of a policy for determining port group statuses.

(2) Assume another case where only one of the two logical units 60 forming an HA logical unit pair is configured for remote copy with a backup logical unit. FIG. 9 depicts an example of this configuration. In FIG. 9, a virtual logical unit 61a is formed of logical units 60a_a and 60b_a and a virtual logical unit 61b is formed of logical units 60a_b and 60b_b. The logical units 60a_a and 60a_b are provided by the storage apparatus 30a and the logical units 60b_a and 60b_b are provided by the storage apparatus 30b.

The logical unit 60a_a forms a remote copy pair with a logical unit 60c in the storage apparatus 30c. The logical unit 60b_b forms a remote copy pair with a logical unit 60d in the storage apparatus 30d.

The administrator should set a status "Active/Optimized" (preferred) to the port groups including the ports 37 associated with the logical units 60a_a and 60b_b of members of remote copy pairs. The administrator should set a status "Active/Non-Optimized" (non-preferred) to the port groups including the ports 37 associated with the independent logical units 60a_b and 60b_a which are not members of remote copy pairs. As a result, the failure resistance of the virtual logical units can be enhanced.

(3) Assume still another case where the storage apparatus 30 having one of the two logical units 60 forming an HA logical unit pair is located close to the host computer 20 and the storage apparatus 30 having the other logical unit 60 is located far from the host computer 20.

Figure 10:
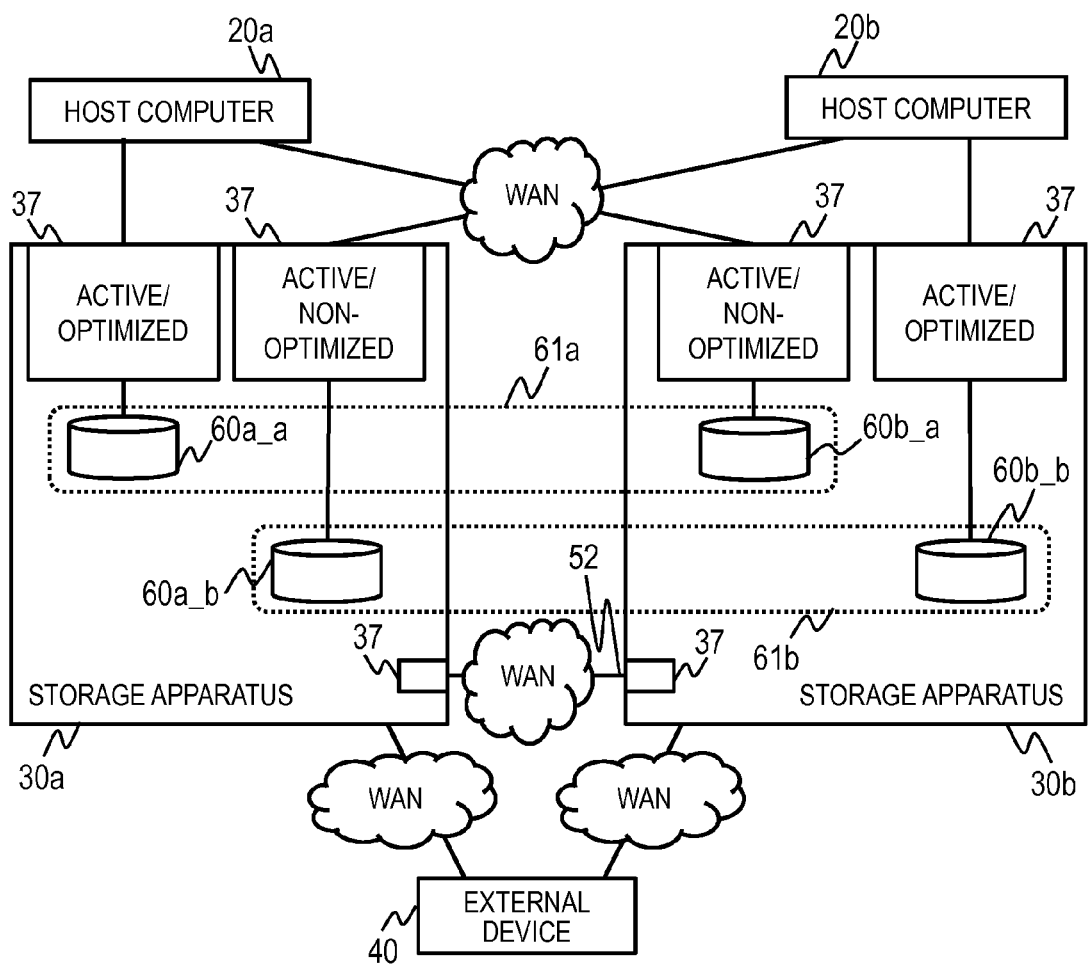
FIG. 10 depicts another example of a policy for determining port group statuses.

FIG. 10 depicts an example of this configuration. In FIG. 10, a virtual logical unit 61a is formed of a logical units 60a_a and 60b_a and a virtual logical unit 61b is formed of logical units 60a_b and 60b_b. The logical units 60a_a and 60a_b are provided by the storage apparatus 30a and the logical units 60b_a and 60b_b are provided by the storage apparatus 30b.

The host computer 20a accesses the virtual logical unit 61a. The host computer 20a is located far from the storage apparatus 30b and close to the storage apparatus 30a. The host computer 20b accesses the virtual logical unit 61b. The host computer 20b is located far from the storage apparatus 30a and close to the storage apparatus 30b.

The administrator should set a status "Active/Optimized" (preferred) to the port group including the port 37 associated with the logical unit 60a_a owned by the storage apparatus 30a located close to the host computer 20a. The administrator should set a status "Active/Non-Optimized" (non-preferred) to the port group including the port 37 associated with the logical unit 60b_a owned by the storage apparatus 30b located far from the host computer 20a.

In similar, the administrator should set a status "Active/Optimized" (preferred) to the port group including the port 37 associated with the logical unit 60b_b owned by the storage apparatus 30b located close to the host computer 20b. The administrator should set a status "Active/Non-Optimized" (non-preferred) to the port group including the port 37 associated with the logical unit 60a_b owned by the storage apparatus 30a located far from the host computer 20b. As a result, the host computers can enjoy shorter response times in accessing the virtual logical units.

(4) As described with reference to FIG. 5B, which logical unit 60 is to be used between the two logical units 60 forming an HA logical unit pair when a failure occurs between the storage apparatuses 30 is predetermined.

In this situation, the logical unit 60 determined to be "available for I/O" at occurrence of communication failure between the storage apparatuses 30 is referred to as primary LU and the logical unit determined to be "unavailable for I/O" is referred to as secondary LU.

The administrator should set a status "Active/Optimized" (preferred) to the port group including the port 37 associated with the primary LU and set a status "Active/Non-Optimized" (non-preferred) to the port group including the port 37 associated with the secondary LU. As a result, the host computer can access the same logical unit even if communications between the storage apparatuses are unavailable.

In the foregoing examples, the administrator of the storage apparatuses 30 manually sets the statuses (preferences) to the port groups. However, the storage apparatuses 30 can be configured to automatically set the statuses to the port groups. For example, in the foregoing case (1), the inter-apparatus communication control programs 116 of the storage apparatuses 30a and 30b send information on their own configuration for local copy to the other apparatus 30 and store received information to their control memories 34.

The port status setting program 119 in each storage apparatus 30 makes the determination described in the foregoing (1) based on the local copy configuration in the apparatus 30 and the paired apparatus 30 and stores the determination result in the PG status management table 114 of the apparatus 30.

In the foregoing case (4), the port status setting program 119 in each storage apparatus 30 makes the determination described in the foregoing (4) with reference the logical unit pair management table 111 in the apparatus 30 based on the information on the primary LU ID and stores the determination result in the PG status management table 114 of the apparatus 30.

In the configuration example illustrated in FIG. 2, HA logical unit pairs are formed of logical units 60 provided by the disk drives 39 existing in the storage apparatuses 30 having apparatus virtualization functionality. Unlike this configuration, HA logical unit pairs may be formed of logical units provided by disk drives in external storage apparatuses.

Figure 11:
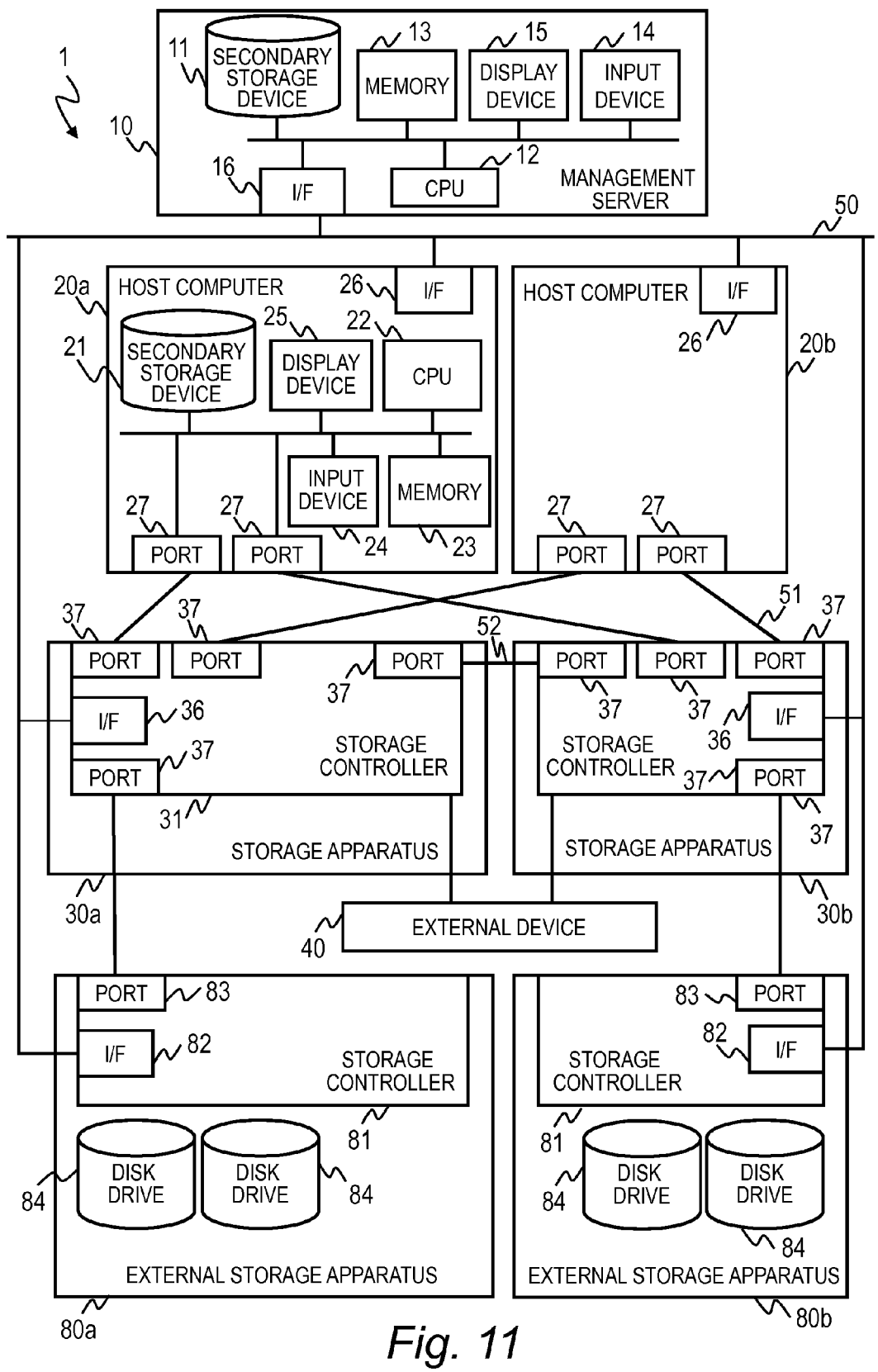
FIG. 11 depicts another configuration example of an information system including external storage apparatuses.

Such a configuration example is depicted in FIG. 11. In FIG. 11, external storage apparatuses 80a and 80b are connected with the storage apparatuses 30a and 30b, respectively. Each of the external storage apparatuses 80a and 80b includes a storage controller 81 and disk drives 84. The storage controller 81 includes an I/F 82 and a port 83.

The external storage apparatuses 80a and 80b configure logical units with the storage areas of the disk drives 84. The storage apparatuses 30a and 30b respectively map the logical units of the external storage apparatuses 80a and 80b to themselves to provide the logical units to the host computers 20 like their own logical units.

The storage apparatuses 30a and 30b may configure an HA logical unit pair only with logical units of the external storage apparatuses 80a and 80b or otherwise, with a logical unit of the external storage apparatus 80a or 80b and a logical unit of the storage apparatus 30b or 30a. This configuration can be implemented regardless of whether the storage apparatuses 30a and 30b have disk drives 39 or whether the external storage apparatuses 80a and 80b have virtualization functionality.

As set forth above, this embodiment eliminates an ALUA-configured storage system provided by a plurality of storage apparatuses from making inconsistent responses to port status report requests designating a virtual logical unit.

Embodiment 2

Embodiment 1 has described an example of an information system including a plurality of ALUA-configured storage apparatuses 30. A plurality of Active-Active HA-configured storage apparatuses have the same problems as ALUA-configured storage apparatuses, independent from whether the HA configuration is symmetric or not. This embodiment, hence, describes a case where symmetric Active-Active HA configuration is constructed with a plurality of storage apparatuses. In order to distinguish from the ALUA configuration, symmetric Active-Active HA configuration may be referred to as SLUA (Symmetric Logical Unit Access).

Hereinafter, differences from Embodiment 1 are mainly described. In the SLUA configuration, each storage apparatus 30 returns the same response about the PG statuses as in Embodiment 1 when communications are unavailable between the storage apparatuses 30 forming an HA storage apparatus pair.

When a host computer 20 accesses a virtual logical unit 61, the SLUA configuration is expected to make no difference in using any path. In normal condition, each storage apparatus 30 should make a response indicating that the PG statuses of all the port groups are "Active/Optimized" (preferred) to a REPORT TARGET PORT GROUPS command issued by the host computer 20.

The host computer 20 can use any path in accessing the virtual logical unit 61. For example, the host computer 20 selects the path to be used to access the virtual logical unit 61 by round-robin from all the paths accessible to the virtual logical unit 61.

However, some path selection policy of the host computer 20 might increase the load to one of the storage apparatuses 30 forming an HA storage apparatus pair.

Accordingly, in making a response to a REPORT TARGET PORT GROUPS command periodically issued by the host computer 20, the storage apparatus 30a or 30b may make the response based on the loads on the both of the storage apparatuses 30a and 30b forming an HA storage apparatus pair. This response based on the loads on the storage apparatuses 30a and 30b is a response when communications are available between the storage apparatuses 30a and 30b forming an HA storage apparatus pair.

For example, each of the storage apparatuses 30a and 30b forming a virtual storage apparatus 70 monitors the usages of all the processors 32 owned by the storage apparatus on a periodic basis to calculate average usages per processor 32 and per unit time with load monitoring program (not shown). Each of the storage apparatuses 30a and 30b sends the calculated values of the apparatus to the paired apparatus to share its own calculated values with the paired apparatus.

If the difference between the average usages in the two storage apparatuses 30a and 30b is more than a predetermined value, the storage apparatus 30 in receipt of the next REPORT TARGET PORT GROUPS command responds "Active/Non-Optimized" (non-preferred) about the PG statuses of a predetermined rate of port groups among the port groups owned by the storage apparatus 30 showing the higher average usage. The predetermined rate can be expressed by a function to increase with the difference in average usage or otherwise, a fixed rate.

Later, if the difference in average usage decreases to less than the predetermined value, the storage apparatus 30 in receipt of the next REPORT TARGET PORT GROUPS command responds "Active/Optimized" (preferred) about all the PG statuses.

The storage apparatuses 30 can use a measurement of load other than the usage of the processors 32. Examples of other measurements of load are average amount of transfer data of the disk drives 39 and average usage of the cache memory 35. A combination of a plurality of kinds of measurements may be used. This embodiment enables appropriate load balancing by controlling the accesses from the host computer depending on the loads on the storage apparatuses.

It should be noted that this invention is not limited to the foregoing embodiments but includes various modifications. For example, a virtual storage apparatus may be formed of three or more storage apparatuses. The storage apparatuses may receive information on port statuses in the paired apparatus and information on copy pairs from a management computer.

The host computer may inquire about the port statuses of a virtual logical unit by inquiring about the statuses of port groups for the virtual logical unit like the foregoing examples or otherwise, by inquiring about the statuses of only the ports for the virtual logical unit. The storage apparatus returns information on the port statuses only about the ports of the virtual logical unit.

The above-described embodiments are explained in detail for better understanding of this invention and are not limited to those including all the configurations and elements described above. A part of the configuration of an embodiment may be replaced with a configuration of another embodiment or a configuration of an embodiment may be incorporated to a configuration of another embodiment. A part of the configuration of each embodiment may be added, deleted, or replaced by that of a different configuration. The drawings show elements required for explanation and do not exactly show all the elements of the product.

What is claimed is:

1. A storage system configured to provide a host computer with a virtual storage apparatus based on a plurality of storage apparatuses including a first storage apparatus and a second storage apparatus capable of communicating with each other,
    the first storage apparatus being configured to provide a first logical unit and including a first port associated with the first logical unit and first port management information including information on a status of the first port, and
    the second storage apparatus being configured to provide a second logical unit and including a second port associated with the second logical unit and second port management information including information on a status of the second port,
    wherein the first logical unit and the second logical unit are provided to the host computer in a form of a virtual logical unit,
    wherein the first storage apparatus is configured to return a response to an inquiry about port statuses from the host computer designating the virtual logical unit, the response indicating that the status of the first port is a status as indicated by the first port management information and the second storage apparatus is unavailable to respond to the inquiry about port statuses, and
    wherein the second storage apparatus is configured to return no response to an inquiry about port statuses from the host computer designating the virtual logical unit.

2. The storage system according to claim 1,
wherein the first storage apparatus holds first logical unit management information on an LU status indicating whether the first logical unit is available for I/O,
wherein the second storage apparatus holds second logical unit management information on an LU status indicating whether the second logical unit is available for I/O, and
wherein the first storage apparatus and the second storage apparatus are configured to determine whether to return a response to an inquiry about port statuses based on LU statuses indicated by the first logical unit management information and the second logical unit management information, respectively.

3. The storage system according to claim 2,
wherein each of the first logical unit management information and the second logical unit management information indicates a primary logical unit to be preferentially selected in case where only one of the first logical unit and the second logical unit is to be used,
wherein the first storage apparatus is configured to maintain the LU status of the first logical unit in the first logical unit management information to be available for I/O in a case where the first logical unit is the primary logical unit and to change the LU status of the first logical unit in the first logical unit management information to be unavailable for I/O in a case where the second logical unit is the primary logical unit when the first logical unit and the second logical unit have lost synchronism, and
wherein the second storage apparatus is configured to maintain the LU status of the second logical unit in the second logical unit management information to be available for I/O in a case where the second logical unit is the primary logical unit and to change the LU status of the second logical unit in the second logical unit management information to be unavailable for I/O in a case where the first logical unit is the primary logical unit when the first logical unit and the second logical unit have lost synchronism.

4. The storage system according to claim 1,
wherein the inquiry about port statuses of the virtual logical unit from the host computer is an inquiry about statuses of port groups of the virtual logical unit,
wherein the response returned by the first storage apparatus specifies an identifier of a first port group including the first port and a status of the first port group, and
wherein the response returned by the first storage apparatus indicates that the second storage apparatus is unavailable to respond to the inquiry about port statuses by specifying an identifier of a second port group including the second port and that the status of the second port group is a status unavailable to respond or by including no information about the second port group.

5. The storage system according to claim 1,
wherein the virtual logical unit is configured to be accessible from the host computer via either the first port or the second port when the first logical unit and the second logical unit are synchronous, and
wherein the first storage apparatus is configured to return the response to the host computer and the second storage apparatus is configured to return no response when the first logical unit and the second logical unit are not synchronous.

6. The storage system according to claim 1,
wherein the first storage apparatus is configured to receive information indicating a status of the second port from the second storage apparatus,
wherein the second storage apparatus is configured to receive information indicating a status of the first port from the first storage apparatus,
wherein the first storage apparatus is configured to return a response indicating that the status of the first port is a status as indicated by the first port management information and the status of the second port is a status as indicated by the information received from the second storage apparatus to the inquiry about port statuses from the host computer designating the virtual logical unit when the first logical unit and the second logical unit are synchronous, and
wherein the second storage apparatus is configured to return a response indicating that the status of the second port is a status as indicated by the second port management information and the status of the first port is a status as indicated by the information received from the first storage apparatus to the inquiry about port statuses from the host computer designating the virtual logical unit when the first logical unit and the second logical unit are synchronous.

7. The storage system according to claim 1,
wherein each of the first storage apparatus and the second storage apparatus holds logical unit preference information indicating preferences of logical units of each virtual logical unit in case where the logical units lose synchronism,
wherein the logical unit preference information indicates that the first logical unit is preferred to the second logical unit, and
wherein each of the first storage apparatus and the second storage apparatus is configured to determine a response to the host computer with reference to the logical unit preference information.

8. The storage system according to claim 1,
wherein, as port statuses for the first port and the second port, preferred port and non-preferred port are defined to indicate preferences for the host computer to access the virtual logical unit,
wherein one of the first logical unit and the second logical unit is configured to form a copy pair with a backup logical unit and the other of the first logical unit and the second logical unit is configured to be an independent logical unit,
wherein the port associated with the one logical unit between the first port and the second port is assigned the port status of preferred port, and
wherein the port associated with the other logical unit between the first port and the second port is assigned the port status of non-preferred port.

9. The storage system according to claim 1,
wherein, as port statuses for the first port and the second port, preferred port and non-preferred port are defined to indicate preferences for the host computer to access the virtual logical unit,
wherein the port located closer to the host computer between the first port and the second port is assigned the port status of preferred port, and
wherein the port located farther from the host computer between the first port and the second port is assigned the port status of non-preferred port.

10. The storage system according to claim 1,
wherein, as port statuses for the first port and the second port, preferred port and non-preferred port are defined to indicate preferences for the host computer to access the virtual logical unit,
wherein each of the first storage apparatus and the second storage apparatus is configured to monitor loaded conditions of the storage apparatus and the other storage apparatus, and
wherein each of the first storage apparatus and the second storage apparatus is configured to determine the statuses of the first port and the second port based on a difference between the loaded conditions of the first storage apparatus and the loaded conditions of the second storage apparatus.

11. A control method for a storage system providing a host computer with a virtual storage apparatus based on a plurality of storage apparatuses including a first storage apparatus and a second storage apparatus,
the first storage apparatus being configured to provide a first logical unit and including a first port associated with the first logical unit and first port management information including information on a status of the first port,
the second storage apparatus being configured to provide a second logical unit and including a second port associated with the second logical unit and second port management information including information on a status of the second port,
the first logical unit and the second logical unit being provided to the host computer in a form of a first virtual logical unit, and
the control method comprising:
    returning, by the first storage apparatus, a response to an inquiry about port statuses from the host computer designating the virtual logical unit, the response indicating that the status of the first port is a status as indicated by the first port management information and the second storage apparatus is unavailable to respond to the inquiry about port statuses; and
    returning, by the second storage apparatus, no response to an inquiry about port statuses from the host computer designating the virtual logical unit.

12. The control method for the storage system according to claim 11,
wherein the first storage apparatus holds first logical unit management information on an LU status indicating whether the first logical unit is available for I/O,
wherein the second storage apparatus holds second logical unit management information on an LU status indicating whether the second logical unit is available for I/O, and
wherein the control method further comprises:
    determining, by the first storage apparatus and the second storage apparatus, whether to return a response to an inquiry about port statuses based on LU statuses indicated by the first logical unit management information and the second logical unit management information, respectively.

13. The control method for the storage system according to claim 12,
wherein each of the first logical unit management information and the second logical unit management information indicates a primary logical unit to be preferentially selected in case where only one of the first logical unit and the second logical unit is to be used, and
wherein the control method further comprises:
    maintaining, by the first storage apparatus, the LU status of the first logical unit in the first logical unit management information to be available for I/O in a case where the first logical unit is the primary logical unit when the first logical unit and the second logical unit have lost synchronism;
    changing, by the first storage apparatus, the LU status of the first logical unit in the first logical unit management information to be unavailable for I/O in a case where the second logical unit is the primary logical unit when the first logical unit and the second logical unit have lost synchronism;
    maintaining, by the second storage apparatus, the LU status of the second logical unit in the second logical unit management information to be available for I/O in a case where the second logical unit is the primary logical unit when the first logical unit and the second logical unit have lost synchronism; and
    changing, by the second storage apparatus, the LU status of the second logical unit in the second logical unit management information to be unavailable for I/O in a case where the first logical unit is the primary logical unit when the first logical unit and the second logical unit have lost synchronism.

14. The control method for the storage system according to claim 11,
wherein the inquiry about port statuses of the virtual logical unit from the host computer is an inquiry about statuses of port groups of the virtual logical unit,
wherein the response returned by the first storage apparatus specifies an identifier of a first port group including the first port and a status of the first port group, and
wherein the response returned by the first storage apparatus indicates that the second storage apparatus is unavailable to respond to the inquiry about port statuses by specifying an identifier of a second port group including the second port and that the status of the second port group is a status unavailable to respond or by including no information about the second port group.

15. The control method for the storage system according to claim 11,
wherein the virtual logical unit is configured to be accessible from the host computer via either the first port or the second port when the first logical unit and the second logical unit are synchronous, and
wherein the control method further comprises:
    returning, by the first storage apparatus, the response to the host computer when the first logical unit and the second logical unit are not synchronous; and
    returning, by the second storage apparatus, no response when the first logical unit and the second logical unit are not synchronous.

* * * * *